United States Patent
Mohan et al.

(10) Patent No.: US 8,508,149 B2
(45) Date of Patent: Aug. 13, 2013

(54) INTELLIGENT LIGHT RETROFIT

(75) Inventors: Tanuj Mohan, Mountain View, CA (US); Premal Ashar, Mountain View, CA (US)

(73) Assignee: enLighted, Inc., Sunnyvale, CA (US)

( * ) Notice: Subject to any disclaimer, the term of this patent is extended or adjusted under 35 U.S.C. 154(b) by 440 days.

(21) Appl. No.: 12/849,081

(22) Filed: Aug. 3, 2010

(65) Prior Publication Data
US 2012/0032599 A1 Feb. 9, 2012

(51) Int. Cl.
*H05B 37/02* (2006.01)

(52) U.S. Cl.
USPC ............... 315/291; 315/307; 315/194

(58) Field of Classification Search
USPC ............. 315/291, 224, 307, 308, 194, 86–87, 315/51
See application file for complete search history.

(56) References Cited

U.S. PATENT DOCUMENTS

| | | | |
|---|---|---|---|
| 5,101,141 A | 3/1992 | Warner et al. | |
| 5,179,324 A | 1/1993 | Audbert | |
| 5,191,265 A | 3/1993 | D'Aleo et al. | |
| 5,283,516 A | 2/1994 | Lohoff | |
| 5,812,422 A | 9/1998 | Lyons | |
| 6,057,654 A | 5/2000 | Cousy et al. | |
| 6,188,181 B1 | 2/2001 | Sinha et al. | |
| 6,342,994 B1 | 1/2002 | Cousy et al. | |
| 6,548,967 B1 | 4/2003 | Dowling et al. | |
| 7,309,985 B2 | 12/2007 | Eggers et al. | |
| 7,348,736 B2 | 3/2008 | Piepgras et al. | |
| 7,382,271 B2 | 6/2008 | McFarland | |
| 7,437,596 B2 | 10/2008 | McFarland | |
| 7,550,931 B2 | 6/2009 | Lys et al. | |
| 7,566,137 B2 | 7/2009 | Veskovic | |
| 7,623,042 B2 * | 11/2009 | Huizenga | 340/641 |
| 7,792,956 B2 | 9/2010 | Choong et al. | |
| 7,812,543 B2 * | 10/2010 | Budike, Jr. | 315/157 |
| 7,925,384 B2 | 4/2011 | Huizenga et al. | |
| 2004/0002792 A1 | 1/2004 | Hoffknecht | |
| 2005/0169643 A1 | 8/2005 | Franklin | |
| 2005/0231112 A1 | 10/2005 | Wo et al. | |
| 2006/0275040 A1 | 12/2006 | Franklin | |
| 2007/0057807 A1 | 3/2007 | Walters et al. | |
| 2007/0061050 A1 | 3/2007 | Hoffknecht | |
| 2007/0086128 A1 | 4/2007 | Lane et al. | |
| 2007/0215794 A1 | 9/2007 | Cernasov et al. | |
| 2008/0185977 A1 | 8/2008 | Veskovic et al. | |
| 2008/0244104 A1 | 10/2008 | Clemente | |
| 2009/0026966 A1 | 1/2009 | Budde et al. | |
| 2009/0179596 A1 | 7/2009 | Willaert et al. | |
| 2009/0195161 A1 | 8/2009 | Lane et al. | |
| 2010/0034386 A1 | 2/2010 | Choong et al. | |
| 2010/0135186 A1 | 6/2010 | Choong et al. | |
| 2010/0264846 A1 | 10/2010 | Chemel et al. | |
| 2010/0270933 A1 | 10/2010 | Chemal et al. | |
| 2010/0280677 A1 * | 11/2010 | Budike, Jr. | 700/296 |
| 2010/0295482 A1 | 11/2010 | Chemel et al. | |
| 2010/0301777 A1 | 12/2010 | Kraemer | |
| 2011/0031897 A1 | 2/2011 | Henig et al. | |

* cited by examiner

*Primary Examiner* — James H Cho
(74) *Attorney, Agent, or Firm* — Brian R. Short

(57) ABSTRACT

An apparatus and method of retrofitting a light fixture are disclosed. One method includes interfacing a retrofit controller with a dimming ballast of the light fixture, connecting the retrofit controller to at least one sensor, and connecting the retrofit controller to a power supply and a network. Another embodiment includes a light fixture retrofit controller and a separate sensor unit. The combination of the retrofit controller and a separate sensor unit are operative to provide power and dimming control of a dimming ballast of an existing light fixture. The dimming control is base on at least one of a signal sensed by the separate sensor unit and control information received from a network.

16 Claims, 4 Drawing Sheets

INTELLIGENT LIGHT RETROFIT

FIELD OF THE EMBODIMENTS

The described embodiments relate generally to lighting. More particularly, the described embodiments relate to retrofitting a light fixture, providing the light fixture with intelligence.

BACKGROUND

Lighting control can be used to automatically control lighting under certain conditions, thereby conserving power. However, lighting control, specifically advanced lighting controls have not been widely adopted in the general commercial market because the installation, setup related costs and complexity have made these lighting systems prohibitively expensive for most commercial customers. Additionally, if these systems include intelligence, they are centrally controlled. Central control is not as flexible.

It is desirable to have a lighting method, system and apparatus for distributed intelligent lighting that is easy to install and is cost effective.

SUMMARY

One embodiment includes a method of retrofitting a light fixture. The method includes interfacing a retrofit controller with a dimming ballast of the light fixture, connecting the retrofit controller to at least one sensor, and connecting the retrofit controller to a power supply and a network.

Another embodiment includes a light fixture retrofit controller and a separate sensor unit. The combination of the retrofit controller and a separate sensor unit are operative to provide power and dimming control of a dimming ballast of an existing light fixture. The dimming control is based on at least one of a signal sensed by the separate sensor unit and control information received from a network.

Another embodiment includes a light fixture retrofit kit. The light retrofit kit includes a sensor unit and a dimming controller. The sensor unit includes a sensor that is operative to generate a sensed signal based on at least one of sensed motion or light. The sensor unit also includes wireless communication circuitry that is operative to maintain a wireless link with a network, and a controller that is operative to manage communication with the network, and to generate dimming control based on at least one of the sensed signal and communication from the network. The dimming controller includes means for receiving the dimming control and operative to adjust a dimming control line to a dimming ballast.

Other aspects and advantages of the described embodiments will become apparent from the following detailed description, taken in conjunction with the accompanying drawings, illustrating by way of example the principles of the described embodiments.

DETAILED DESCRIPTION

The described embodiments are embodied in an apparatus and method for retrofitting a light fixture. The retrofit kit allows for upgrading of presently existing minimal intelligent light fixtures without having to modify existing power line and power control wiring. The retrofitted light fixture allows for intelligent control of the light of the light fixture. The retrofitted light fixture can be networked with other retrofitted light fixtures allowing for distributed control of multiple light fixtures. Additionally, embodiments of the retrofitted light include network interfaces for additional or alternative light control.

Figure 1A:
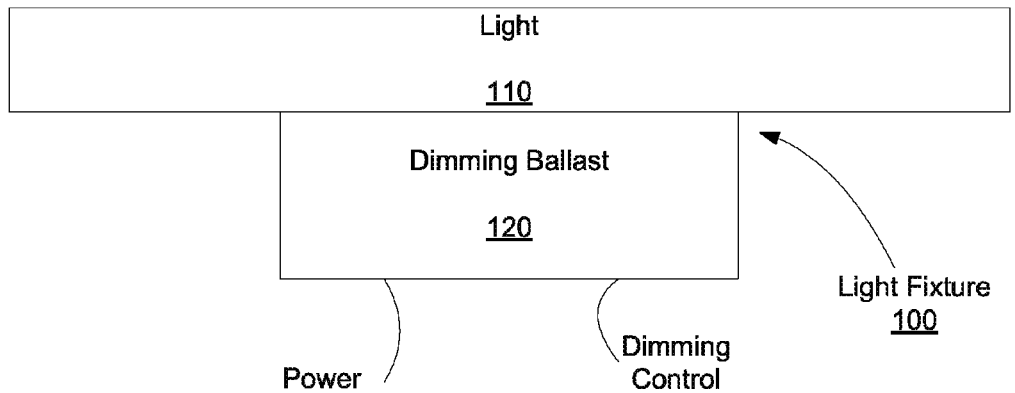
FIG. 1 shows an example of a prior art light fixture.

FIG. 1A shows an example of a prior art light fixture 100. The light fixture 100 includes a light 110, and a dimming ballast 120. As shown, the dimming ballast 120 receives a power input and a dimming control input, and provides a regulated current to the light 110.

The light 110 can be a gas-discharge lamp, which is typically negative-resistance device. Such devices cannot effectively regulate their current use. If such a device were connected to a constant-voltage power supply, it would draw an increasing amount of current until it was destroyed or caused the power supply to fail. To prevent this, a ballast (such as the dimming ballast 120) provides a positive resistance that limits the ultimate current to an appropriate level. In this way, the ballast provides for the proper operation of the negative-resistance device by appearing to be a legitimate, stable resistance in the circuit.

As shown, the lighting fixture 100 has no intelligence. The lighting fixture 100 receives all lighting control, which includes power and dimming of the light of the light fixture.

Figure 1B:
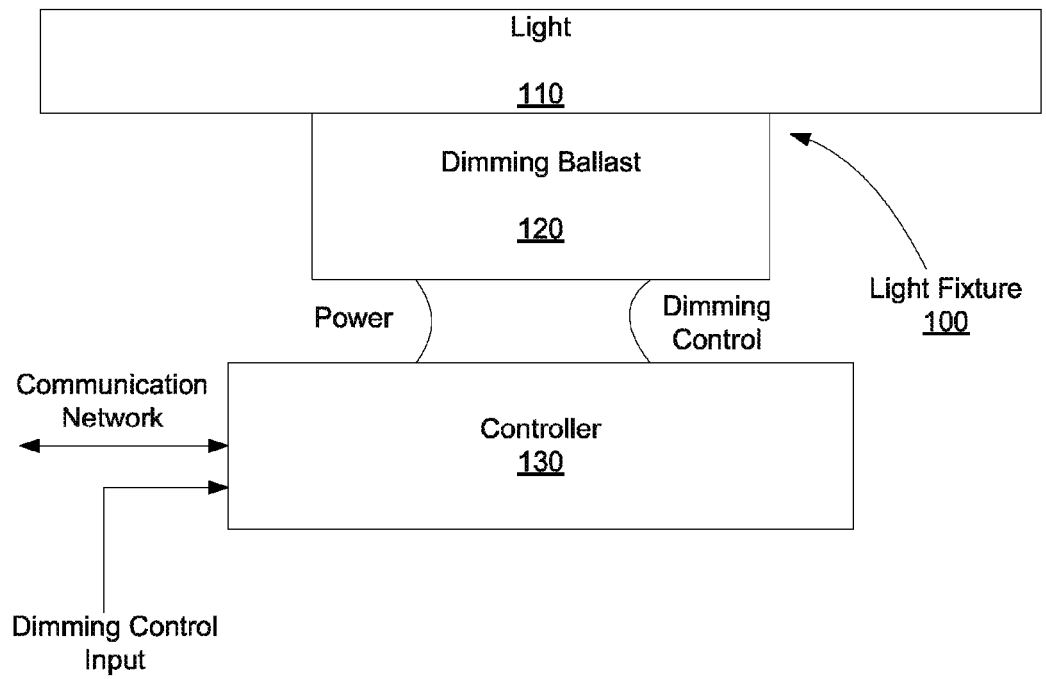

FIG. 1B shows an example of another prior art light fixture 100. The light fixture 100 includes a light 110, a dimming ballast 120, and a controller 130. The controller 130 is operative to receive inputs from a network, or directly from a dimming control input. As shown, the dimming ballast 120 receives a power input and a dimming control input, and provides a regulated current to the light 110.

The light fixture may include a controller 130, but has no intelligence regarding control of the light 110. That is, the network may direct the controller 130 as to how to control the light 110, but the controller 130 does not make its own dimming control decisions. The controller 130 can also directly receive dimming control, but again, the controller 130 does not make its own dimming control decisions.

Figure 2:
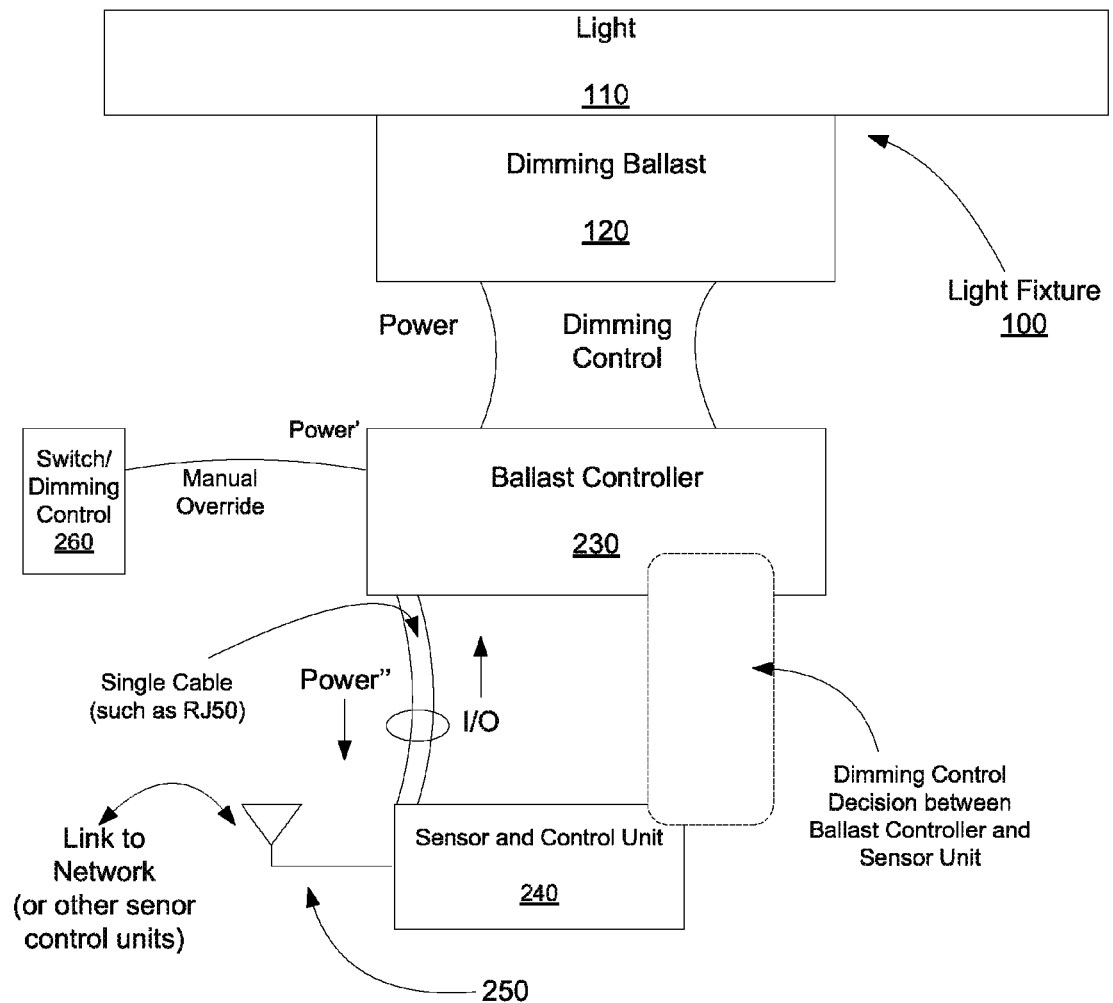
FIG. 2 shows an example of light fixture that has been retrofitted to provide intelligence.

FIG. 2 shows an example of light fixture 100 that has been retrofitted to provide intelligence. More specifically, a ballast controller 230 has been connected to the power and dimming control inputs of the dimming ballast 120. Additionally, a sensor unit 240 is connected to the ballast controller 230.

For an embodiment, the ballast controller 230 provides power to the sensor unit 240, and the sensor unit 240 provides control signals to the ballast controller 230. This embodiment further includes a communications link being established between the sensor unit 240 and a network. Rather than being connected to a network, the sensor unit can connect to other sensor units and ballast controllers, allowing for decentralized control of a plurality of light fixtures. For a specific embodiment, the sensor unit 240 includes at least one antenna 250 and is wirelessly linked (through, for example, BLUETOOTH® or ZIGBEE®) to the network, or other devices.

The wireless link can advantageously be located within the sensor unit 240 rather than within the ballast controller 230 because some configurations include the ballast controller 230 being located within a common metal enclosure as the light fixture 100. Locating the wireless link within the ballast controller could subject the wireless link to attenuation cause by the metal enclosure. By locating the antenna proximate to, but outside of the metal enclosure of the light fixture 100, the quality of the wireless link can be sustained.

For an embodiment, the conductor providing power from the ballast controller 230 to the sensor unit 240, and the conductor(s) providing control signal(s) from the sensor unit 240 to the ballast controller are located in a common cable. For an embodiment, the voltage provided to power the sensor unit 240 is, for example, a low-power DC voltage. Being a low voltage, the sensor unit 240 can be connected, and re-connected to the ballast controller by a lay-person. That is, the voltage supply is low enough that, for example, replacement of the sensor unit is safe enough that an electrician is not required to make the replacement. For an embodiment, the sensor unit 240 is attached to a ceiling proximate to the ballast controller 230. The cable allows for easy installation of the retrofit ballast controller 230 and retrofit sensor unit 240. Exemplary cables include a flat cable with a RJ-45, RJ-50 like connector at either end. Flat cables can be desirable because that can easily slip easily between a guide-rail and a ceiling tile of a typical industrial ceiling, without requiring a hole in the tile.

Embodiments include all of the ballast control processing based on the sensed signals and any network input occurring all or partially within the sensor unit 240. Other embodiments include varying amount of the ballast control processing occurring within the ballast controller 230. As indicated in FIG. 2, the dimming control decisions can be distributed between the ballast controller and the sensor unit 240.

A manual switch, dimming control or timing dimming control unit 260 can provide manual dimming control. Dimming control can be transferred from automated control provided by the ballast controller 230 and the sensor unit 240, to manual control provided by the dimming control unit 260, by the dimming control unit 260 communicating a transfer of control. The transfer of control can be communicated, for example, by the dimming control unit 260 cycling power supplied by the dimming control unit 260 according to a predetermined sequence. For example, the predetermined sequence can include manually power cycling by the dimming control unit 260 three times within a predetermined amount of time. If the ballast controller 230 and the sensor unit 240 combination receives the power cycling according to the predetermined sequence (three cycles) then the manual over-ride is invoked, and the dimming control unit 260 provides manual control until, for example, another sequence transfers dimming control back to the ballast controller 230 and the sensor unit 240 combination. Once in manual mode, the sensed signals no longer influence the dimming control.

An existing light fixture can be upgraded as shown in FIG. 2 without having to modify or update existing electrical wiring and switches. This is very desirable because the upgrade is easy, fast and inexpensive to implement. Once upgraded, many light fixtures can be managed with decentralized control. Decentralized control is desirable over centralized control because there is not a single point of failure. A purchaser of the retrofit kits can upgrade existing light fixtures over time.

Figure 3:
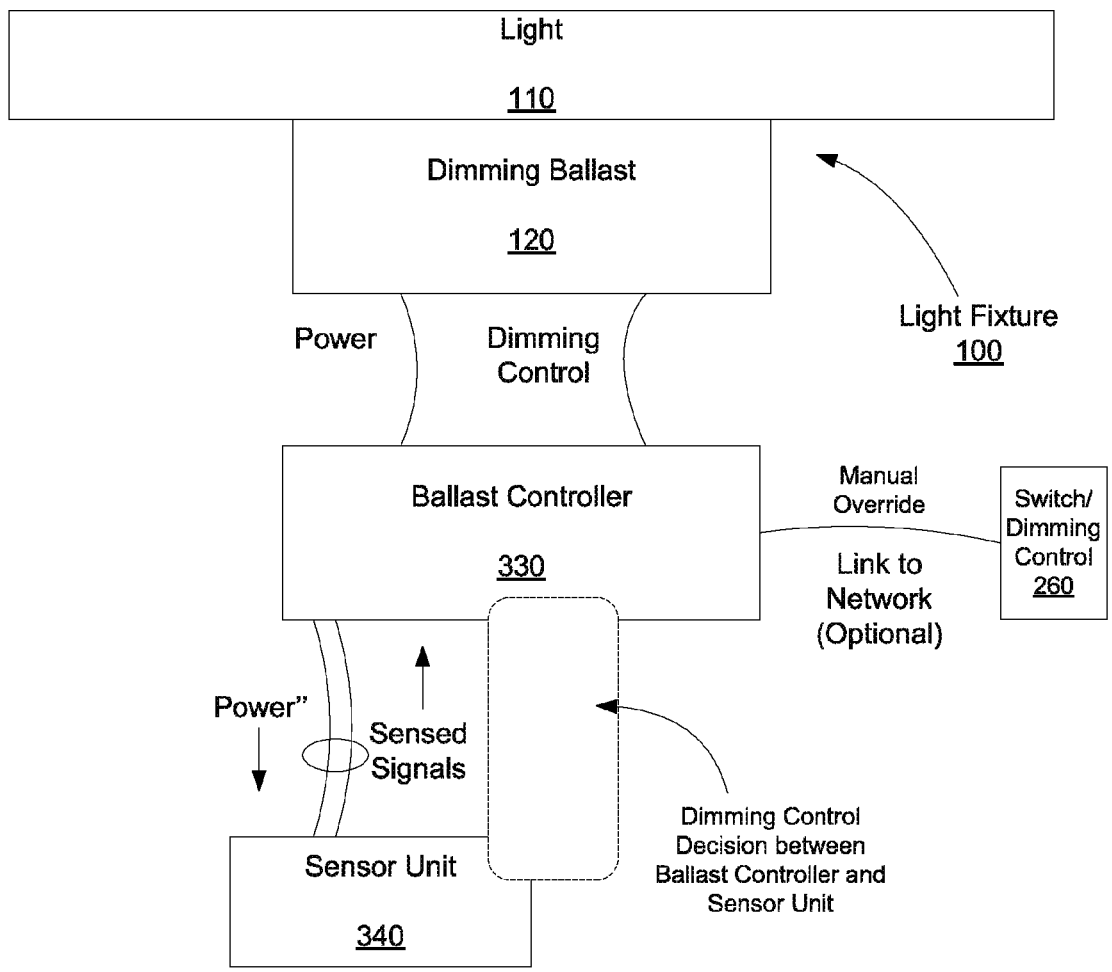
FIG. 3 shows another example of light fixture that has been retrofitted to provide intelligence.

FIG. 3 shows another example of light fixture that has been retrofitted to provide intelligence. Here again, a ballast controller 330 has been connected to the power and dimming control inputs of the dimming ballast 120. Additionally, a sensor unit 340 is connected to the ballast controller 330.

For this embodiment, however, the ballast controller 330 is interfaced to a network through, for example, the power line. As before, the ballast controller 330 receives power as well.

As previously described, a manual switch, dimming control or timing dimming control unit 260 can provide manual dimming control. Dimming control can be transferred from automated control provided by the ballast controller 330 and the sensor unit 340 by the dimming control unit 260 communicating a transfer of control as previously described.

For this embodiment, the sensor unit 340 does not include as much intelligence, and the sensor unit 340 is not connected to the network. The sensor unit 340 may or may not provide dimming controls. For an embodiment, the sensor unit 340 only provides sensed signals that the ballast controller 330 performs the processing in determining the dimming control. Embodiments include varying amounts of the dimming control processing occurring in the sensor unit 340 and the ballast controller 330 as depicted in FIG. 3.

An embodiment includes a lighting fixture retrofit kit. The retrofit kit includes a sensor unit, a dimming controller and an electrical cable. The retrofit kit when purchased can be used to retrofit a "non-intelligent" light fixture as shown in FIG. 1, to be an "intelligent" light fixture as shown in FIG. 2. Embodiments of the sensor unit include one or more sensors. The sensors can include, for example, a light sensor, a motion sensor and/or a temperature sensor. When functioning, the sensor is operative to generate a sensed signal based on, for example, sensed motion, light and/or temperature. The sensor unit additionally includes wireless communication circuitry. When activated, the wireless communication circuitry is operative to maintain a wireless link (for example, Bluetooth) with a network. The sensor unit additionally includes a controller, wherein the controller is operative to manage communication with the network, and to generate dimming control based on at least one of the sensed signal and communication from the network. The dimming controller include means for receiving the dimming control from the sensor unit, and is operative to adjust a dimming control line to a light ballast.

Figure 4:
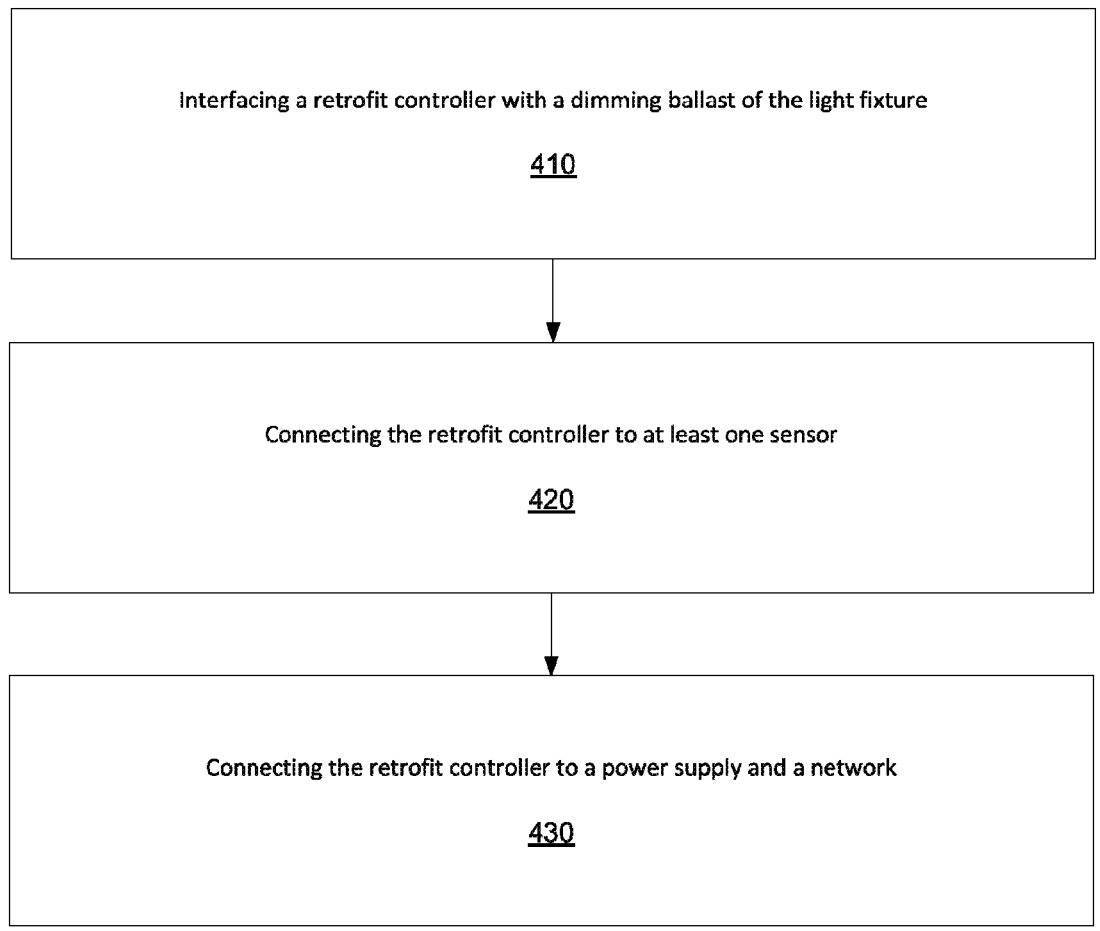
FIG. 4 is a flow chart that includes steps of an example of a method of retrofitting a light fixture.

FIG. 4 is a flow chart that includes steps of an example of a method of retrofitting a light fixture. A first step 410 includes interfacing a retrofit controller with a dimming ballast of the light fixture. A second step 420 includes connecting the retrofit controller to at least one sensor. A third step 430 includes connecting the retrofit controller to a power supply and a network.

As shown, for example, in FIG. 2, one embodiment includes the retrofit controller being connected to the network (or other sensors of other light fixtures) through the at least one sensor. As shown, for example, in FIG. 3, one other embodiment includes the retrofit controller being connected to the network through a power line.

For an embodiment, interfacing the retrofit controller with the dimming ballast includes breaking existing power supply and dimming control connections of the dimming ballast, inserting the retrofit controller, and connecting the power supply and dimming connections of the dimming ballast to the retrofit controller. Additionally, the retrofit controller is connected to at least one sensor comprises attaching an external electrically conductive line between at least one external sensor and the retrofit controller. Existing external electrical wiring and switches can be left alone and not modified.

For an embodiment, the at least one external sensor is affixed proximate to the light fixture. For example, if the light fixture is attached to the ceiling of a room, the at least external sensor is affixed to the ceiling proximate to the light fixture.

An external electrically conductive line is connected between the retrofit controller and the at least one external sensor. For an embodiment, the external electrically conductive line provides power to the at least one external sensor from the retrofit controller. For an embodiment, the external electrically conductive line provides control information from the at least one external sensor to the retrofit controller.

The at least one external sensor can merely provide sensed signals, or the at least one external sensor can include a controller, and the at least one external sensor being wirelessly connected to a network. Additionally, embodiments include the at least one external sensor providing dimming control information to the retrofit controller based on at least one of sensed information and control information received from the network.

For another embodiment, the retrofit controller receiving sensed information from the at least one sensor, and adaptively controlling the dimming ballast based on the sensed information. The sensed information can include, for example, sensed light, sensed motion, or sensed temperature, in which intelligent lighting control decisions can be made.

If many of retrofitted intelligent light controllers are operating in conjunction, the light controllers can all be interfaced with a central controller. For this embodiment, the retrofit controller can receive control information through the network from a utility manager interface. Alternatively, the light controllers can include decentralized control, and each retrofit controller can receive control information from other retrofit controllers over the network.

As previously mentioned, the connection between the retrofit controller and the network includes a wireless link.

In some situations, it may be determined that automated control of the light controllers is not desirable, and that the controls should be manual. An embodiment includes providing a manual over-ride, allowing manual input control of dimming control of the dimming ballast.

Although specific embodiments have been described and illustrated, the described embodiments are not to be limited to the specific forms or arrangements of parts so described and illustrated. The embodiments are limited only by the appended claims.

What is claimed:

1. A method of retrofitting a light fixture, comprising:
   interfacing a retrofit controller with a dimming ballast of the light fixture;
   connecting the retrofit controller to at least one sensor; and
   connecting the retrofit controller to a power supply and a network; wherein the retrofit controller provides low-power to the at least one sensor, allowing the at least one sensor to be electrically connected, removed and replaced without an electrician.

2. The method of claim 1, wherein the retrofit controller is connected to the network through the at least one sensor.

3. The method of claim 1, wherein the retrofit controller is connected to the network through a power line.

4. The method of claim 1, wherein interfacing the retrofit controller with the dimming ballast comprises breaking existing power supply and dimming control connections of the dimming ballast, inserting the retrofit controller, and connecting the power supply and dimming connections of the dimming ballast to the retrofit controller, while maintaining existing electrical switch and wiring connections.

5. The method of claim 1, further comprising the retrofit controller receiving sensed information from the at least one sensor, and adaptively controlling the dimming ballast based on the sensed information.

6. The method of claim 5, wherein the sensed information comprises a combination of sensed light, sensed motion, and sensed temperature.

7. The method of claim 1, further comprising the retrofit controller receiving control information from other retrofit controllers over the network.

8. The method of claim 1, further comprising providing a manual over-ride, allowing manual input control of dimming control of the dimming ballast utilizing an existing dimming control mechanism.

9. A method of retrofitting a light fixture, comprising:
   interfacing a retrofit controller with a dimming ballast of the light fixture;
   connecting the retrofit controller to at least one sensor; and
   connecting the retrofit controller to a power supply and a network;
   wherein connecting the retrofit controller to at least one sensor comprises attaching an external electrically conductive line between at least one external sensor and the retrofit controller; and
   wherein the external electrically conductive line provides power to the at least one external sensor from the retrofit controller.

10. The method of claim 9, further comprising affixing the at least one external sensor proximate to the light fixture.

11. The method of claim 9, wherein the external electrically conductive line provides at least one of sensor and control information from the at least one external sensor to the retrofit controller.

12. The method of claim 11, further comprising the at least one external sensor comprising a controller, and the at least one external sensor being wirelessly connected to a network.

13. The method of claim 12, further comprising the at least one external sensor providing dimming control information to the retrofit controller based on at least one of sensed information and control information received from the network.

14. A light fixture retrofit kit comprising:
   a sensor unit and a dimming controller; wherein
      the sensor unit comprises;
         a sensor, the sensor operative to generate a sensed signal based on at least one of sensed motion or light;
         wireless communication circuitry, the wireless communication circuitry operative to maintain a wireless link with a network;
         a controller, the controller operative to manage communication with the network, and to generate dimming control based on at least one of the sensed signal and communication from the network; and
   wherein
      the dimming controller comprises;
         means for receiving the dimming control and operative to adjust a dimming control line to a light ballast.

15. The retrofit kit of claim 14, further comprising a flat electrical cable for providing electrical power from the dimming controller to the sensor unit, and providing control lines from the sensor unit to the dimming controller.

16. The retrofit kit of claim 14, further comprising the dimming controller operative to identify a sequence of power cycling, and transferring dimming control to a manual switch when a predetermined sequence of power cycling is received.

* * * * *